United States Patent [19]

Ritchie

[11] 4,182,522
[45] Jan. 8, 1980

[54] FOLDING BICYCLES

[76] Inventor: Andrew W. Ritchie, 53 Egerton Gardens, London, England, SW3

[21] Appl. No.: 794,519

[22] Filed: May 6, 1977

[30] Foreign Application Priority Data

May 7, 1976 [GB] United Kingdom ............... 18950/76

[51] Int. Cl.$^2$ ............................................. B62K 15/00
[52] U.S. Cl. .................................... 280/278; 280/287
[58] Field of Search ................... 280/278, 281 R, 287

[56] References Cited

U.S. PATENT DOCUMENTS

| 1,584,568 | 5/1926 | Clark | 280/278 |
| 3,015,498 | 1/1962 | Tanaka et al. | 280/278 |
| 3,993,322 | 11/1976 | Van Tijen | 280/278 |

FOREIGN PATENT DOCUMENTS

| 628783 | 2/1963 | Belgium | 280/278 |
| 526773 | 9/1940 | United Kingdom | 280/287 |

Primary Examiner—Joseph F. Peters, Jr.
Assistant Examiner—Michael Mar
Attorney, Agent, or Firm—Brisebois & Kruger

[57] ABSTRACT

The present invention concerns a novel folding bicycle in which the rear wheel is mounted in a rear frame hinged to the main frame of the bicycle so that the rear frame can be folded beneath the bicycle. The main frame is also provided with a hinge and the handlebars fold downwardly. Special quick release clamps are also provided for the various folding parts.

9 Claims, 11 Drawing Figures

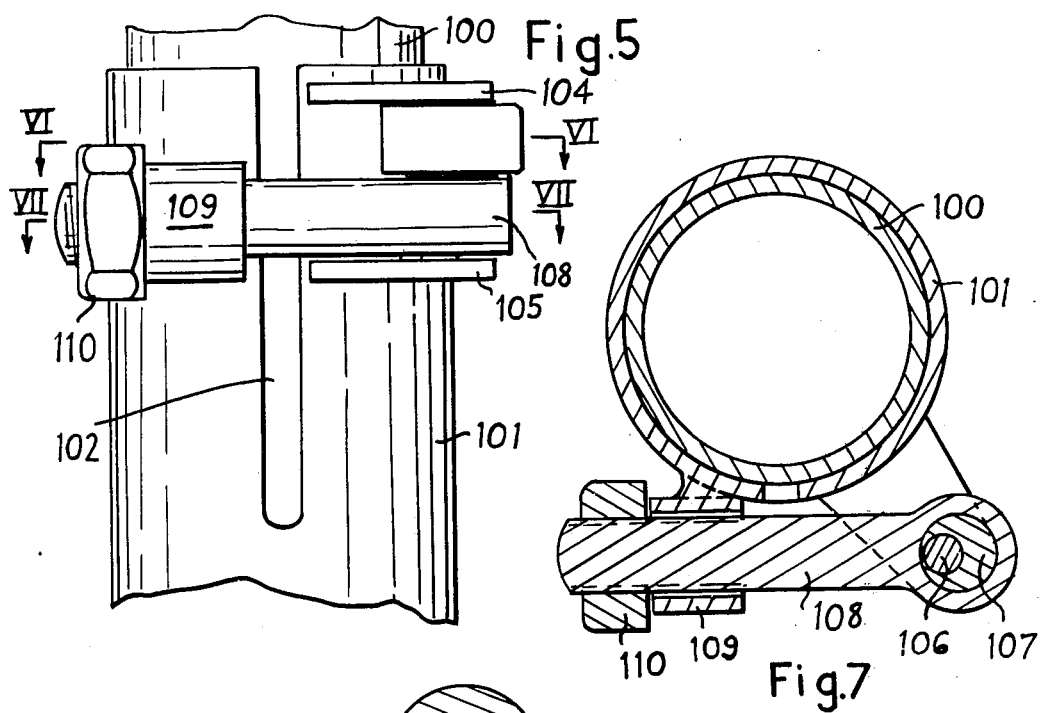
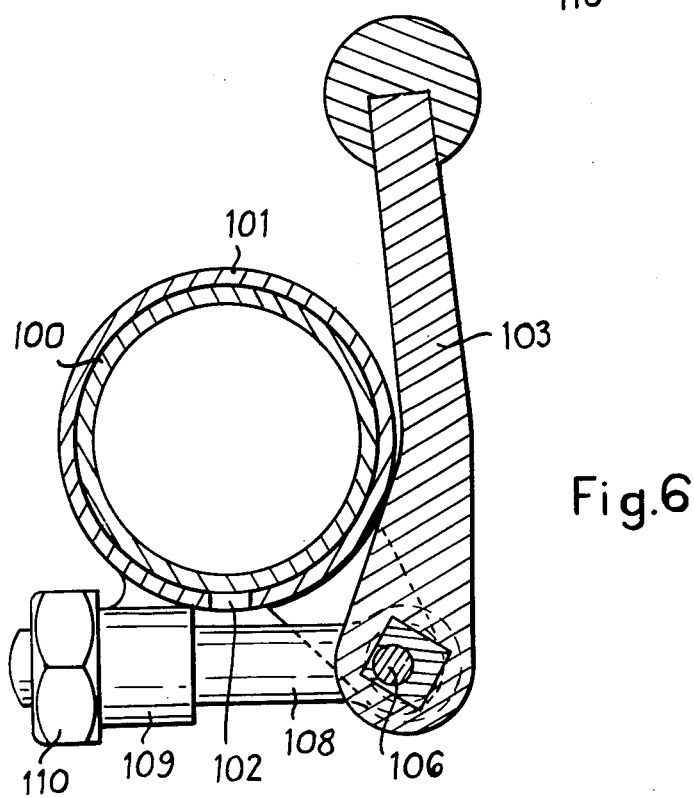

FOLDING BICYCLES

The present invention concerns folding bicycles.

It has for an object to provide a folding bicycle which can be folded in a relatively simple manner into an extremely compact configuration. The invention has for a further object to provide a folding bicycle which when in its folded condition can readily stand without the need for additional support means, thus ensuring ease of stowage.

Furthermore the invention has for an object to provide a folding bicycle which once in its folded condition can be firmly held in the folded condition again with a corresponding ease of handling and stowage.

In the specification and claims all references to directions of movement of various parts of the bicycle or to directions of axes are given in relation to a bicycle in its unfolded or operative condition.

Figure 1:
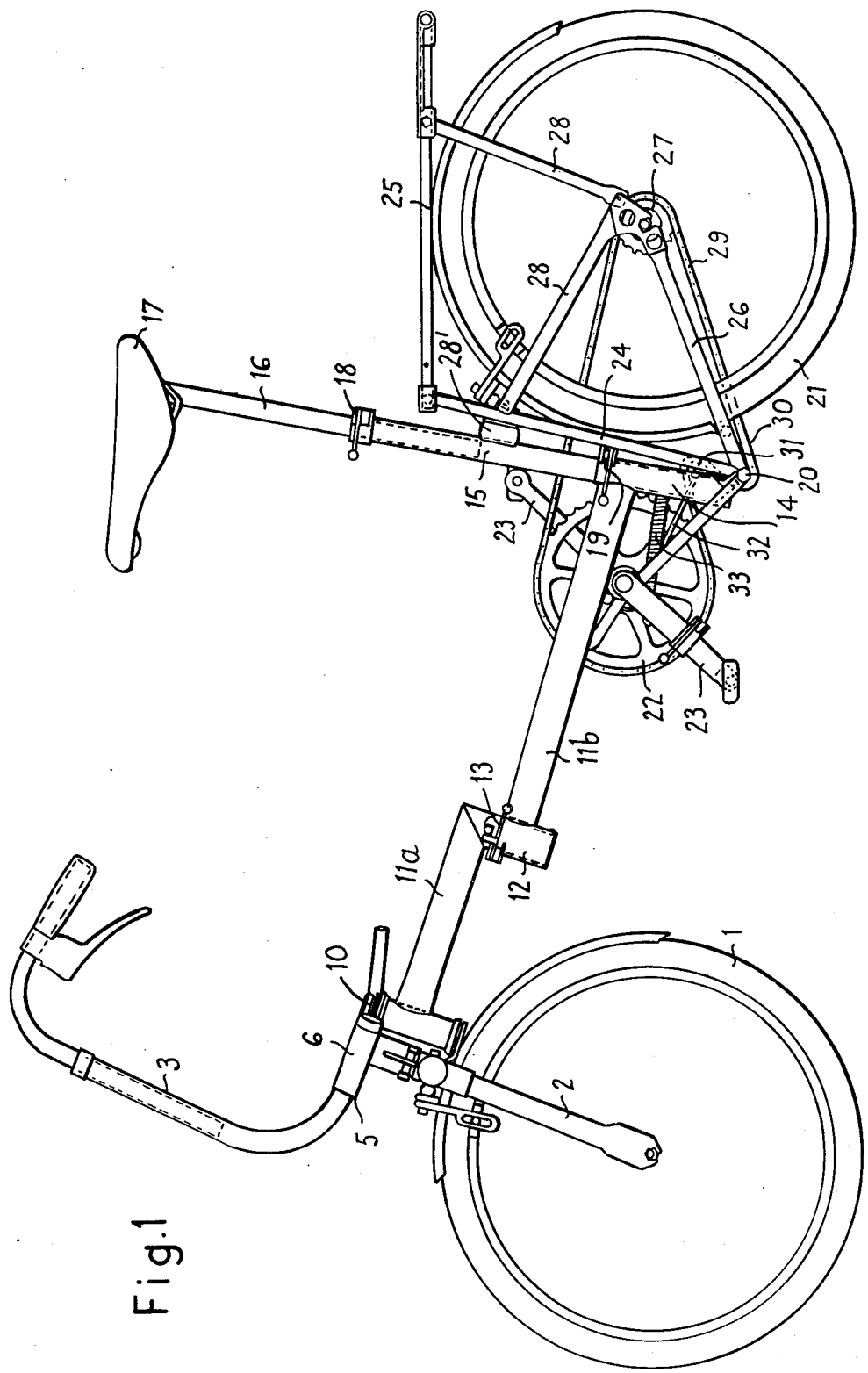
Figure 2:
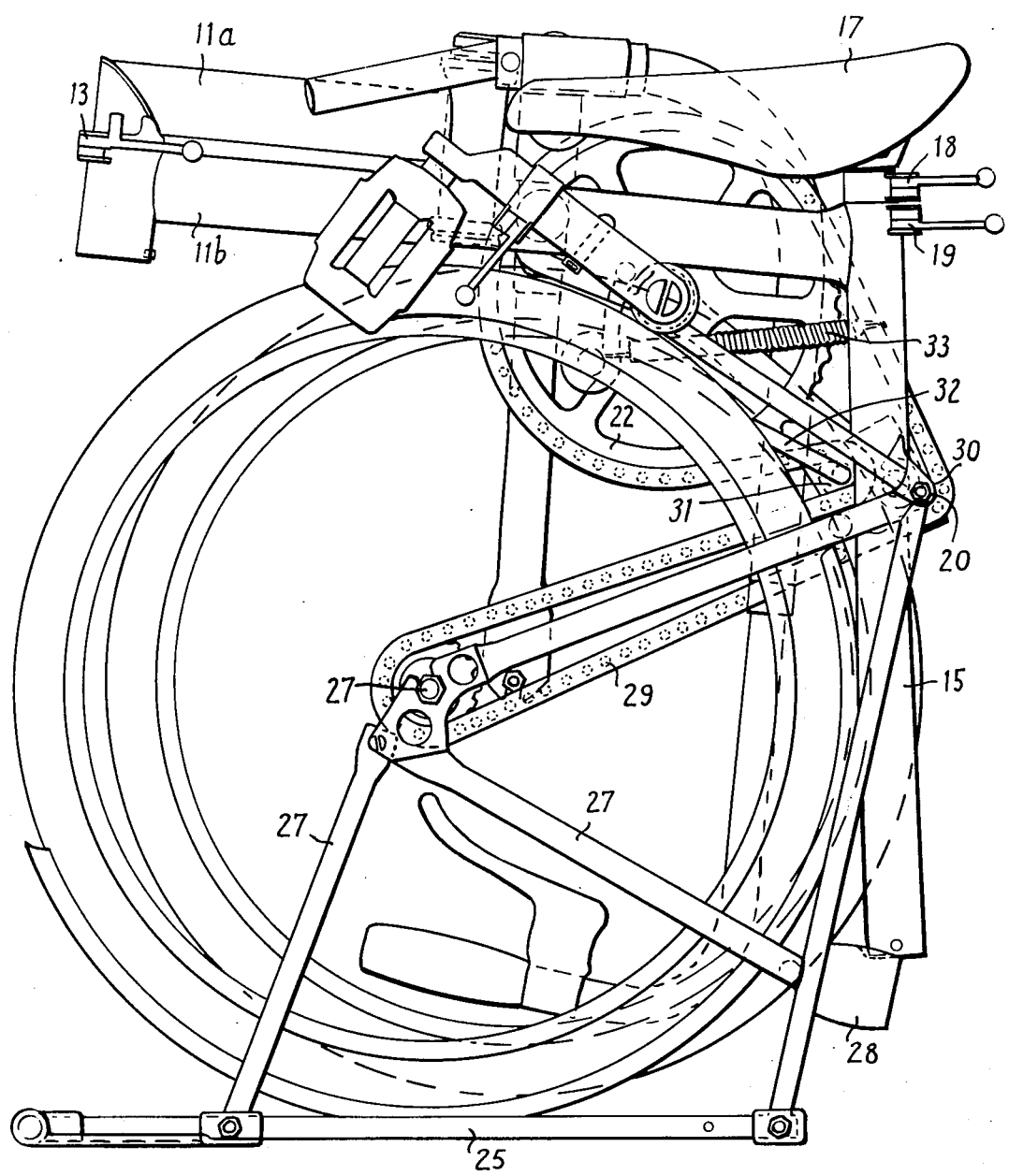
Figure 3:
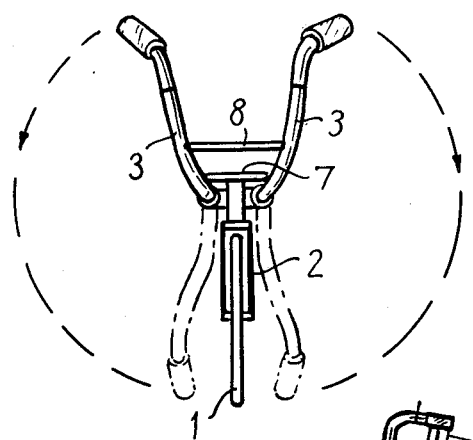
Figure 4A:
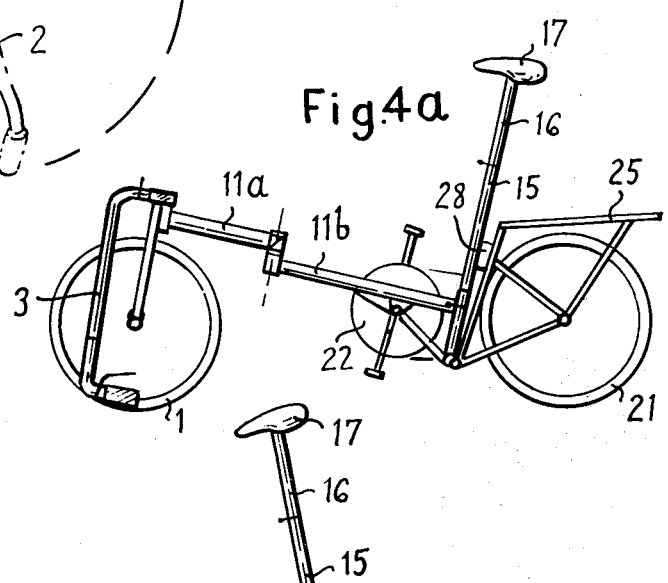
Figure 8:
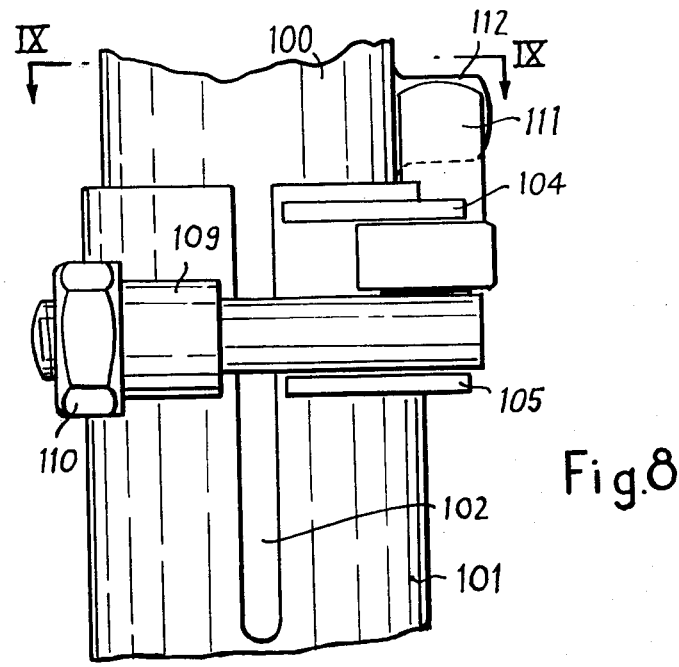
Figure 9:
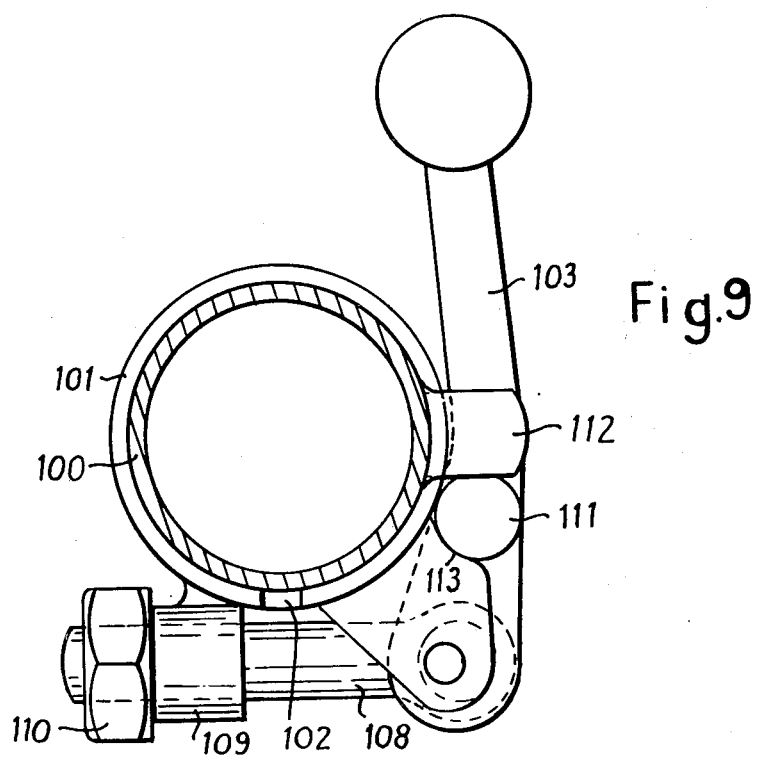

In order that the present invention may be more readily understood an embodiment thereof will now be described by way of example and with reference to the accompanying drawings, in which:

FIG. 1 is a side elevation of a bicycle constructed in accordance with the present invention, FIG. 2 is a similar view showing the bicycle folded, FIG. 3 is a diagrammatic end view of the front of the bicycle of FIG. 2 showing how the handlebars of the bicycle fold, FIGS. 4a, b and c are diagrammatic views showing various stages in the folding of the bicycle, FIG. 5 is a side elevation, FIGS. 6 and 7 sections on lines VI—VI and VII—VII respectively of one type of clamp used in the bicycle of FIG. 1, FIGS. 8 and 9 are a side elevation and on line VIII—VIII section through a second type of clamp.

The folding bicycle shown in the accompanying drawings has a front wheel assembly comprising a front wheel 1 mounted on a fork 2 above which is mounted a pair of handlebars 3 each of which can be folded downwardly to lie alongside the wheel 1. Each handlebar 3 has a tubular portion 5 extending into a sleeve 6 of circular cross-section carried above the fork 2 so that it can pivot within the sleeve relative to the fork and front wheel. In the unfolded position a stop 7 mounted on the fork and located between the pivots of the handlebars 3 prevents them from moving towards one another beyond the position shown in FIG. 3 and the handlebars are held in this position by a link 8. The link 8 is hooked at one end and flexibly secured at its other end to one of the handlebars. The hooked end of the link 8 can be hooked to the other handlebar so as to extend between them, the length of the link 8 being such that the handlebars 3 are flexed slightly towards one another in order to provide rigidity to the handlebars when they are unfolded. Unhooking the link 8 allows the handlebars to be folded downwardly. The pivoting axes of the two handlebars are arranged to converge slightly in the forward direction so that, when unfolded, the hand grips are slightly splayed outwardly for the comfort of the rider of the bicycle and so that, when folded the grips be substantially parallel to the front wheel. The front wheel assembly including the handlebars 3 and wheel 1 pivot about a conventionally inclined steering pivot 10 carried in the front part 11a of a main frame member 11, the front part 11a being pivotted to the rear part 11b of the main frame at 12. The pivot comprises a tubular portion on the front part 11a received within a cylindrical portion on the rear part 11b so as to be capable of rotation therein. The pivot 12 is provided with a releasable clamping mechanism 13 which frictionally clamps the two parts against relative pivoting and which will be described in greater detail hereinafter, the clamping mechanism 13 enabling the parts to be clamped relative to one another in both the erect and the folded condition of the bicycle. The rear end of the part 11b carries a tubular seat support member 14 in which is received a tubular seat strut 15 which in turn receives a seat post 16 carrying a saddle 17. The height of the seat can be adjusted by sliding the post 16 in the strut 15 and then clamping it with a clamp 18. The saddle support strut 15 is also slidable relative to the saddle support member 14 and can be clamped relative to the latter by a clamp 19. At its lower end the saddle support member 14 carries a horizontal pivot 20 about which a rear wheel frame in which the rear wheel 21 is mounted can pivot during folding and unfolding of the bicycle. It will be appreciated that this pivot 20 is located below and behind the axis about which the chain wheel 22 of the bicycle rotates; the importance of this will become apparent when the operation of folding the bicycle is explained hereinafter. The chain wheel 22 is provided as usual with pedals 23 and the left hand pedal can also be folded so as to make the bicycle in its folded configuration as compact as possible.

The rear wheel assembly comprises a pair of tubular struts 24 connected at their upper and lower ends by cross bars to form a rectangular frame. The upper end of this frame is connected to a luggage carrier 25 and the lower end to a pair of tubular struts 26 extending on either side of the rear wheel 21 to carry the hub 27 of the rear wheel. Additional bracer struts 27' extend on either side of the wheel 21 from the hub to the struts 24 and the luggage carrier 25 respectively. The struts also carry a resilient shock pad 28' which when the bicycle is in its erect condition bears against the seat support strut 15. It will be appreciated that the pivot 20 is the only point of connection between the rear wheel frame and remainder of the bicycle. Thus if the bicycle is lifted vertically off the ground the whole rear wheel frame will pivot downwardly about the pivot 20. In use the combined effect of the weight of the bicycle and a rider will mean that the bicycle will behave as if the rear wheel assembly were rigidly mounted as in a conventional bicycle save that the resilient pad 28 will act as a shock absorber.

The bicycle is provided with conventional front and rear brakes and the drive between the chain wheel 22 and the hub sprocket of the rear wheel 21 is by a conventional chain 29. However in order to keep the chain 29 under tension during the downward movement of the rear wheel assembly when the bicycle is folded there is provided a chain tensioner arrangement. Thus the chain 29 passes around a fixed idler roller 30 coaxial with the pivot axis 20 and a floating idler roller 31 mounted on one end of a chain tensioner arm 32, the other end of which can pivot so that the idler roller 31 can move along an arc substantially concentric with the chain wheel 22. A spring 33 extending between strut 14 and arm 32 biases the idler roller 31 to move in an anticlockwise direction. From FIG. 1 it will be seen that the lower run of chain passes in zig-zag fashion over the floating idler roller 31 and under the idler 30.

The folding operation of the bicycle from the erect configuration of FIG. 1 to the folded configuration of FIG. 2 will now be described.

Figure 4B:
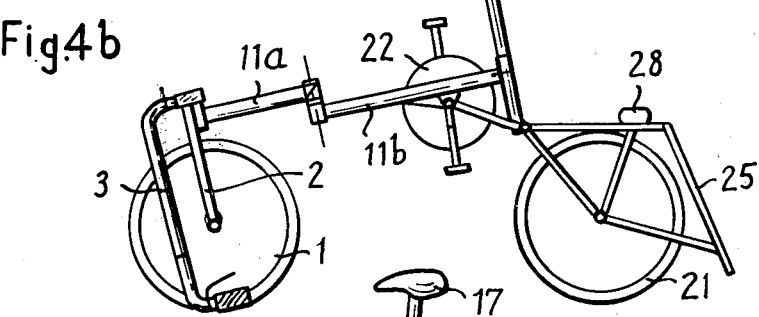
Figure 4C:
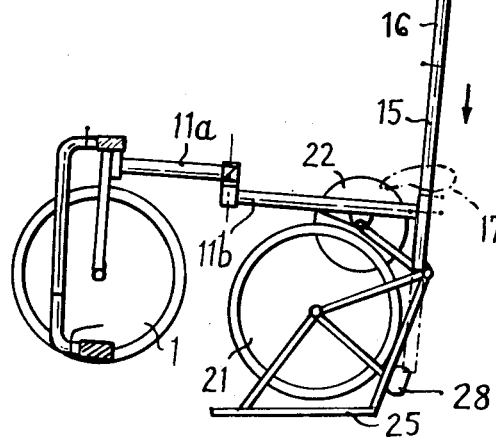

Firstly the link 8 is disconnected. This enables the handlebars to be folded downwardly as shown in FIG. 3 and FIG. 4a. The right hand pedal crank is moved to a position such that the right hand pedal is approximately above the axis of the chain wheel. By lifting the bicycle by the seat 17 or seat support strut 15 or other convenient hold on the central frame, the rear wheel frame rotates clockwise about the pivot 20. This is shown in FIG. 4b. Thus the hub of the rear wheel moves from a position behind the strut 15 to a position in front of the strut 15 until the rear of the luggage carrier 25 touches the ground and, by pushing the bicycle backwards, this rotation is continued until the rear wheel 21 comes into contact with the base of part 11b of the main frame. This is the position shown in FIG. 4c.

At this stage the whole machine is supported on the now inverted luggage carrier 25. As the above described manoeuvre takes place, first the lower or return half of the chain 29 ceases to bear against the idler wheel 30 and, shortly after, the upper or drive half of the chain starts to bear against idler wheel 30, and the chain assumes the configuration shown in FIG. 2, still maintained in tension by the effect of the chain tensioner assembly formed by the floating idler 31, chain tensioner arm 32 and spring 33, bearing against the return half of the chain. During this manoeuvre the right hand pedal tends to move of its own accord to a position to the rear of the axis of the chain wheel 20.

The clamp 13 is now released and the forward part 11a of the main frame together with the front wheel assembly with the now folded handlebars, is drawn round so that it rotates clockwise (as seen from above) about the pivot 12. This rotation is continued until the front wheel lies alongside the rear wheel. The clamp 13 is then done up again, so securing the two parts 11a, 11b, in the folded configuration. The right hand pedal is now pushed backwards and down until it lies adjacent the front wheel and folded handlebars. If the left hand pedal is foldable, it may now be folded. The clamps 18 and 19 holding the saddle are now released and the saddle is pushed down, until the clamp 18 butts against the clamp 19 and the lower end of strut 15 engages the shock pad 38 and so stops rotation of the rear frame. The bicycle may now be carried, possibly by a suitably placed carrying handle (not shown), the rear frame being prevented from rotating downwardly by virtue of the strut 15 bearing on the rubber shock pad 38.

It will be appreciated that the foregoing description involves the use of several clamps, some of which allow sliding movement between a pair of tubes mounted one within the other and some of which allow rotational movement between a pair of tubular members. Whilst any suitable clamping means may be used two particularly advantageous embodiments, both permitting quick release will now be described, firstly for sliding movement such as clamps 18, 19 and secondly for rotational movement such as clamp 13 located at pivot 12.

Thus the clamp shown in FIGS. 5 to 7 is for releasably clamping together two tubular members 100, 101 against relative sliding movement, one end of member 100 being received with member 101. Member 101 has a longitudinal slot 102 so that it can be compressed by the action of a lever 103 so as to grip member 100 tightly.

The lever 103 is mounted between two flanges 104, 105 so that it can pivot about a pivot pin 106 mounted between the two flanges. Movement of the lever 103 causes rotation of a cylindrical portion 107 which is eccentric with regard to pin 106. The portion 107 is received in a cylindrical aperture in one end of a bolt 108 the other end of which is screw-threaded and extends through a boss 109 having a circular opening. The boss 109 and the flanges are mounted on the member 101 on either side of the slot 102. The screw-threaded end of bolt 108 carries a nut 110.

This clamp operates as follows: when lever 103 is in the position shown in FIG. 8, the nut 110 is so adjusted that the bolt 108 is in tension and causes those parts of tube 101 which lie on either side of slot 102 to be drawn together to grip tube 100 to prevent relative movement between the two tubes.

When lever 103 is moved clockwise the rotation of the eccentric portion 107 about pin 106 causes a movement of bolt 108 sufficient to relax the grip of tube 101 on tube 100 allowing tube 100 to slide within the tube 101. A return movement of the lever 103 again locks the two tubes against relative movement.

FIGS. 8 and 9 show another clamp which can be used for clamping two members against relative rotational movement and for allowing such movement when the bicycle is being folded. Such a clamp is thus suitable for use in conjunction with pivot 12.

This clamp is similar to the one shown in FIGS. 7 to 9 except that the lever 103 carries a circular boss 111 extending beyond the end of tube 101, and tube 100 is also provided with a circular boss 112 projecting radially therefrom. Furthermore the flange 104 is so shaped that when the lever 103 is moved to the position shown in FIG. 11, the boss 111 bears against an edge 113 which is approximately radial with respect to the common axis of tubes 100, 101.

In the embodiment being described it is assumed that movement into the folded configuration between the two tubes is by clockwise rotation of tube 100 relative to tube 101 It is accordingly so arranged that the boss 112 is so located on the tube 100 that when tube 100 is in the unfolded position and the boss 111 bears against edge 113, the boss 111 lies in the path of boss 112 during the initial movement of tube 100. Thus the tube 100 is prevented from rotating relative to the tube 101 by more than a very small amount towards the folded configuration in the event that a sufficiently large rotational force urging the tube 100 so to rotate be applied to overcome the frictional resistance caused by the clamping mechanism. When the lever 103 is moved clockwise from the position shown in FIG. 10, so releasing the clamping mechanism, the boss 111 moves with the lever 103 to a position outside the path followed by the boss 112 during folding and unfolding.

In order to reduce wear and friction in the various tubular parts of the bicycle which slide or rotate relative to one another during folding and unfolding of the bicycle, each pair of interengaged tubular parts may include a cylindrical sleeve of synthetic material between the two parts.

It will be appreciated that the above description has been solely concerned with a pedal bicycle. However, the manner in which the handlebars, main frame and rear frame fold, together with the associated clamps are of course equally applicable to a bicycle propelled by other means. Such a bicycle might have an electric or internal combustion enging driving either the front or rear wheel. In such a case it might be possible to dispense with the pedal and chain drive.

I claim:

1. A folding bicycle comprising:
   (a) a main frame member;
   (b) a front frame including a steerable front wheel assembly; and
   (c) a rear wheel assembly, including a rear wheel;
   (d) a saddle;
   (e) pivot means on said main frame interconnecting said main frame member and said rear wheel assembly whereby said rear wheel assembly can pivot relative to said main frame member in the plane of said rear wheel into a folded position in which the axle of said rear wheel is located beneath said main frame member; and
   (f) means interconnecting said front frame and said main frame assembly whereby said front wheel assembly may be moved on folding into a position in which said front wheel lies substantially alongside said rear wheel when the said rear wheel assembly is in its folded condition; and
   (g) a strut carried by and slidable relative to said main frame member into a raised position and a lowered position and supporting said saddle; said strut, when in its lowered position, and when said rear frame assembly is in its folded position, lying in the path of said rear wheel assembly to prevent the latter moving into its unfolded position.

2. A folding bicycle comprising:
   (a) a main frame member;
   (b) a front frame including a steerable front wheel assembly; and
   (c) a rear wheel assembly, including a rear wheel;
   (d) pivot means on said main frame interconnecting said main frame member and said rear wheel assembly whereby said rear wheel assembly can pivot relative to said main frame member in the plane of said rear wheel into a folded position in which the axle of said rear wheel is located beneath said main frame member;
   (e) means interconnecting said front frame and said main frame assembly whereby said front wheel assembly may be moved on folding into a position in which said front wheel lies substantially alongside said rear wheel when the said rear wheel assembly is in its folded condition; and
   (f) wherein said rear wheel assembly carries a support member, said support member, whem the rear wheel assembly is in its folded condition providing a base on which the bicycle will stand without support by other means.

3. The folding bicycle of claim 2, wherein said pivot means is so positioned with respect to said main frame member and said rear wheel assembly that said support member is substantially horizontal when the bicycle is in its unfolded condition.

4. A folding bicycle comprising:
   (a) a main frame member;
   (b) a front frame including a steerable front wheel assembly;
   (c) a rear wheel assembly, including a rear wheel;
   (d) pivot means on said main frame interconnecting said main frame member and said rear wheel assembly whereby said rear wheel assembly can pivot relative to said main frame member in the plane of said rear wheel into a folded position in which the axle of said rear wheel is located beneath said main frame member;
   (e) means interconnecting said front frame and said main frame assembly whereby said front wheel assembly may be moved on folding into a position in which said front wheel lies substantially alongside said rear wheel when the said rear wheel assembly is in its folded condition; and
   (f) further comprising: a treadle mechanism supported by said main frame member, the axis of said treadle mechanism being so located with respect to the axis of said pivot means between said main frame member and said rear wheel assembly that in the folded condition the distance between the axis of said rear wheel and said treadle mechanism is less than when the bicycle is in its unfolded condition.

5. The folding bicycle of claim 4, and further comprising:
   (a) an endless flexible drive member for transmitting drive from said treadle mechanism to said rear wheel;
   (b) tensioning means for maintaining said drive member under tension during movement of said rear wheel assembly from its unfolded position into its folded position, said tensioning means comprising;
   (c) a fixed idler mounted substantially concentric with respect to the axis of said pivot means between said main frame member and said rear wheel assembly;
   (d) a spring-biased floating idler, the lower run of said drive member passing beneath said fixed idler and over said floating idler when the bicycle is in its unfolded condition; and wherein in the folded condition of the bicycle the lower run of said drive member is disengaged from said fixed idler whilst remaining engaged on said floating idler, and the upper run of said drive member passes over said fixed idler.

6. A folding bicycle comprising:
   (a) a main frame member;
   (b) a front frame including a steerable front wheel assembly;
   (c) a rear wheel assembly including a rear wheel;
   (d) first pivot means on said main frame interconnecting said main frame member and said rear wheel assembly whereby said rear wheel assembly can pivot relative to said main frame member in the plane of said rear wheel from an unfolded position to a folded position in which the axle of said rear wheel is located beneath said main frame member, the position of said pivot means being such that the rear wheel moves to a position when folded which lies substantially between the positions occupied by the front and rear wheels when the bicycle is unfolded, the axis of the rear wheel in said unfolded position lying behind, and in said folded condition, lying in front of the axis of said first pivot means,
   (e) means for holding said rear wheel assembly in said folded position;
   (f) second pivot means interconnecting said main frame member and said front frame, whereby said front frame can pivot relative to the main frame member about an axis transverse to the axis of pivotal movement of said rear wheel assembly to permit movement of said front frame from an unfolded position to a folded position in which said front wheel lies substantially alongside said rear wheel when said rear wheel assembly is also in its folded condition; and (g) clamp means for locking said front frame in both its folded and unfolded positions.

7. The folding bicycle of claim 6, and further comprising resilient shock absorber means located between said main frame member and said rear wheel assembly when the bicycle is in its unfolded condition to prevent movement of said rear wheel assembly beyond its predetermined unfolded position.

8. The folding bicycle of claim 7, and further comprising a support member carried by said rear wheel assembly, said first pivot means being so located that when said bicycle is in its folded condition said support member acts as a base to support the folded bicycle unaided by other means, and when said bicycle is in its unfolded condition, said support member is substantially horizontal.

9. In a folding bicycle comprising:
(a) a main frame member;
(b) a front frame including a steerable front wheel assembly; and
(c) a rear wheel assembly, including a rear wheel; the improvement comprising:
(d) pivot means on said main frame interconnecting said main frame member and said rear wheel assembly whereby said rear wheel assembly can pivot relative to said main frame member in the plane of said rear wheel into a folded position in which the axle of said rear wheel is located beneath said main frame member, the position of said pivot means being such that the rear wheel moves to a position when folded which lies substantially between the positions occupied by the front and rear wheels when the bicycle is unfolded; and
(e) means interconnecting said front frame and said main frame assembly whereby said front wheel assembly may be moved on folding into a position in which said front wheel lies substantially along the side of said rear wheel when the said rear wheel assembly is in its folded condition.

* * * * *